Patented Oct. 10, 1922.

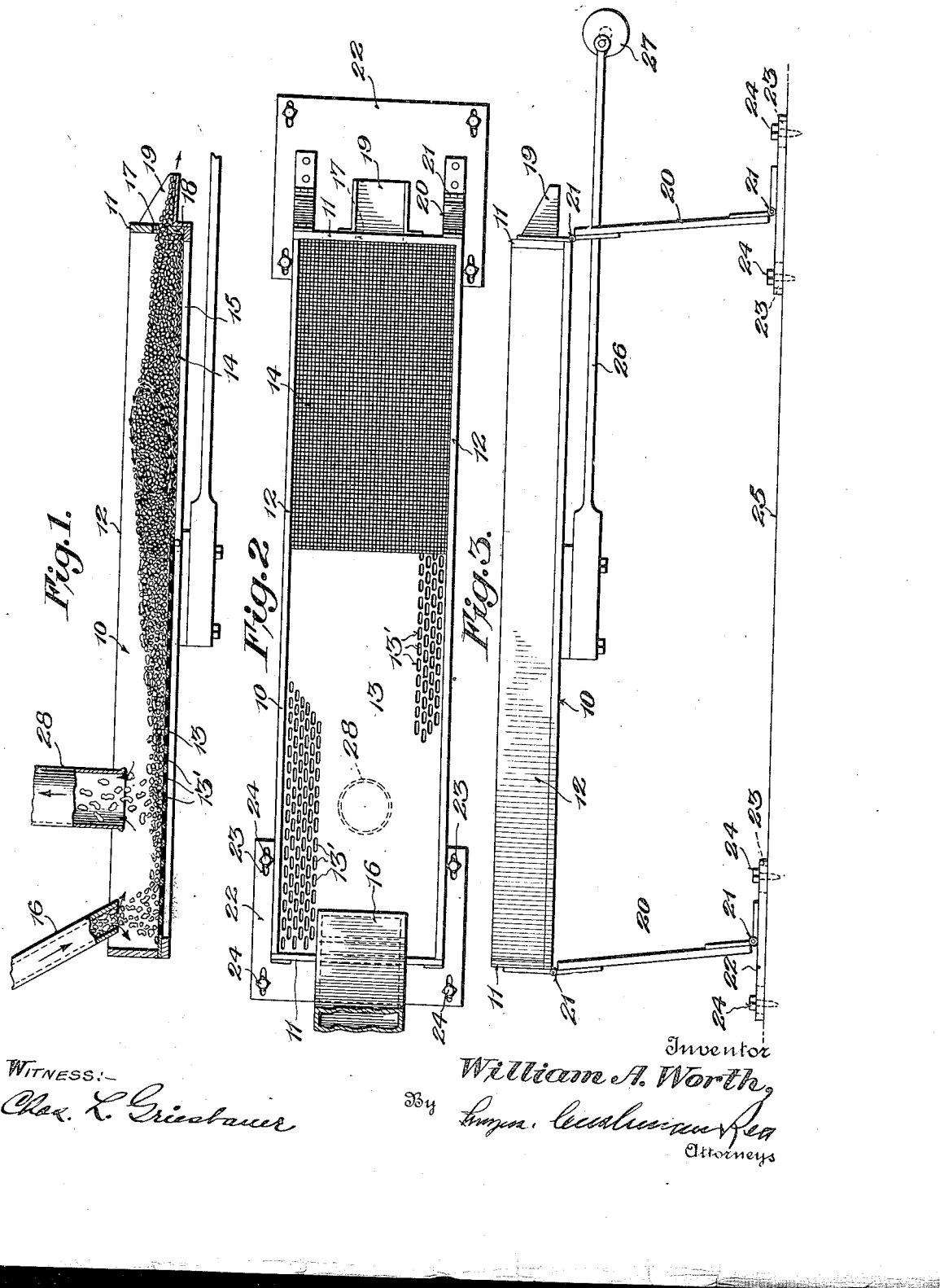

1,431,205

UNITED STATES PATENT OFFICE.

WILLIAM A. WORTH, OF PETERSBURG, VIRGINIA, ASSIGNOR TO RIVERSIDE PEANUT CO., OF PETERSBURG, VIRGINIA, A CORPORATION OF VIRGINIA.

METHOD OF AND APPARATUS FOR SEPARATING.

Application filed April 18, 1918. Serial No. 229,285.

*To all whom it may concern:*

Be it known that I, WILLIAM A. WORTH, a citizen of the United States, residing at Petersburg, in the county of Dinwiddie and State of Virginia, have invented new and useful Improvements in Methods of and Apparatus for Separating, of which the following is a specification.

This invention relates to a method of separating materials having different specific gravities, and also to the apparatus for carrying the method into effect.

The present invention has as one of its purposes to provide a method whereby different kinds of materials, mixed together and having different specific gravities, may be efficiently, thoroughly and quickly separated from each other without re-handling the materials or putting them through a number of separate operations.

My invention also has as its object to provide an apparatus for practicing my improvement, which apparatus is extremely simple in construction, occupies but relatively small space, requires little power to operate, may be readily adjusted to suit varying conditions, and, generally, to provide an apparatus wherein my improved method may be efficiently carried into effect.

In the following specification I will describe my improved method and apparatus as being employed in the separation of peanuts, but it is to be distinctly understood that the present disclosure is by way of illustration only and that my improved method may be practiced and my apparatus employed for separating mixed materials other than peanuts. My invention may be used to separate a large variety of mixed materials having different specific gravities, but a description of the same as applied to the separation of peanuts is sufficiently illustrative to show its adaptability to other materials.

In the accompanying drawings I have illustrated a preferred embodiment of my apparatus, but it is to be remarked the same is susceptible of various modifications and changes which would be within the spirit of my invention without departing from the scope of the appended claims. While I have described the apparatus illustrated in the accompanying drawings as employed for carrying out my improved method, it will be understood that other apparatus may be employed than that shown.

In the drawings:

Figure 1 is a longitudinal, sectional view taken on a vertical plane passing through the shaking table of my separator.

Figure 2 is a top plan view of the separator, and

Figure 3 is a side elevational view thereof.

Before describing my apparatus and the operation thereof, a brief description of the method heretofore practiced in separating the different products present in peanuts, which have been passed through a sheller, will be given, together with the disadvantages thereof, which it is the object of the present invention to overcome.

Shelled peanuts, after the stems, dirt and other foreign matter have been removed from the surfaces of the shells, are passed through a sheller of any suitable type, which cracks and breaks open the shells without mutilating the kernel or nuts. Some of the peanuts are broken transversely into two halves and these halves, which still contain the nuts, are known as nubs. All of the broken shells fall through openings in the sheller and the shelled nuts, together with all of the broken shells, unshelled peanuts and foreign matter, are discharged from the sheller and subjected to a current of air which is sufficiently strong to remove practically all of the broken shells, which are lighter in weight than the shelled nuts or unshelled nuts. The remaining stock, consisting of the whole shelled kernel or peanuts, known in the trade as No. 1's, half nuts or kernels, known as splits or No. 2's, and unshelled half peanuts, known as nubs, are fed onto a sieve or screen, which is reciprocated or otherwise agitated. The No. 1's and 2's pass through openings in the sieve or screen and the nubs are supposed to remain in the sieve. The separation is, however, by no means complete, for the reason that some of the nubs are small enough in size to pass through the screen with the shelled nuts and some of the shelled nuts are too large to pass through the screen. This requires a final separation by hand, the screen shelled nuts and nubs being placed upon a traveling belt, from which operators hand-pick the nubs.

Referring to the drawings, wherein like numerals represent like parts of the several views, 10 designates, generally, a shaking table having a rectangular frame comprising end members 11, side sills or members 12 and a bottom which lies substantially in a horizontal plane. The frame may be of any suitable form, but to obtain the best results, the bottom of the frame should lie in the horizontal plane. The upper surface of the bottom of the table is preferably smoother at that end of the table at which the materials to be separated enter than at the discharge end, for a purpose to be hereinafter described. If desired, the bottom at the entrance end of the table may be formed of a metal sheet 13 having a smooth upper surface and preferably extending for a distance greater than one-half the length of the frame. The metal sheet portion 13 has, by preference, a plurality of elongated slots of 13' of such size as to permit splits to pass therethrough, but not sufficiently large to allow the No. 1 peanuts to pass therethrough. In practice, slots approximately $\frac{13}{64}$ inches wide and $\frac{3}{4}$ inches long have proven most satisfactory. The bottom at the discharge end of the frame may be made of screening 14, such as is ordinarily used in sieves, and which, due to the interlacing or crossing of the wire, provides a rougher surface than the sheet metal portion 13. The mesh of the screening is such as to prevent the shelled peanuts or nubs from passing therethrough, but it will permit small particles of various matter, not removed in the sheller, or by the current of air after passing from the sheller, to fall through the table. I have found that a No. 6 mesh screen may be used to advantage. It is to be understood that the bottom of the table at its discharge end may be formed of any suitable material having a surface rougher than the surface of the bottom at the supply or entrance end of the table. To prevent vibration or sagging of the bottom of the table, lengthwise strips or beams 15 may be provided, to which the sheet metal 13 and the screen 14 are rigidly secured. If preferred, the construction may be such that the bottom of the table may be easily removed.

The materials to be separated may be fed to one end of the table in any suitable manner; such as, by means of the chute 16. The feed of the materials is, of course, regulated in accordance with the rate of separation, but in the present instance no regulator is illustrated, as any suitable or well known type, depending on the kinds of materials to be separated, may be employed.

The member 11 at the discharge end of the table has a discharge opening 17 which is slightly positioned above the screening 14, so as to provide an obstruction or shoulder 18 between the screening and the discharge opening. Preferably the discharge opening does not extend entirely across the end of the frame. The opening 17 delivers to the spout 19.

The table may be supported in any suitable manner which will permit it to be reciprocated in an up and down direction, as well as a longitudinal direction. If desired, it may be suspended from an overhead support, but in the present illustrative disclosure it is carried by legs 20 hingedly-connected at their upper or lower ends to the frame and floor, respectively, by any suitable means; such as, hinges 21. The legs 20 are inclined downwardly from the inlet end toward the discharge end of the table. The legs 20, by preference, are adjustable to vary the amplitude of the table and for this purpose the lower end of the legs may be secured by the hinges 21 to blocks 22, having slots 23 therethrough, through which pass bolts or screws 24 carried by the supporting surface or floor 25.

Secured to the table 10, in any suitable manner, is a pitman 26, which at its opposite end is connected to a crank or eccentric 27. The pitman 26 is slightly flexible so that it may be rigidly connected to the frame.

The numeral 28 designates an air pipe having its open lower end located adjacent the entrance end of the table and spaced slightly above the bottom thereof when the table is in its uppermost position. The nubs and other particles lighter than the shelled peanuts may be drawn off by this pipe.

It is obvious that the shape and size of the parts of my apparatus, the amplitude of the table and the number of reciprocations per minute may be varied and the adjustments changed to suit the conditions under which the separation is carried out, but, by way of example, it may be stated that in the apparatus which I have used in the separation of peanuts, the table is approximately 7 feet long and 1½ feet wide. The abutment or shoulder 18 is about 1 inch high and the outlet opening 17 is 6 inches wide. The lower ends of the legs 20 are set about 4 inches in advance of their upper ends and the pitman is reciprocated about 460 times per minute.

In setting forth the mode of operation of my apparatus, the description will refer to the separation in the preparation of peanuts, but it is obvious that the operation is similar in the separation of other kinds of mixed materials having different specific gravities.

Assuming that the apparatus has been in operation and a bed of peanuts has been formed upon the table, the products, consisting of No. 1 nuts, splits, nubs and some foreign particles discharged from the sheller (not shown) and which remain after the broken shells are removed by the current of air, are fed in a regulated flow or stream to the entrance end of the table and fall upon the relatively smooth surface of the bottom; namely, the metal sheet 13. Due to the inclination of the legs 20, the table when vibrated by means of the pitman 26 and eccentric 27, is given an up and down movement and also a longitudinal movement, due to the agitation, the heavier particles, in the present instance the shelled peanuts, since they have a higher specific gravity, will gravitate toward the bottom of the table and will force the nubs or unshelled peanuts, the stems or other like trash which might be present, to the top of the bed. The half shelled peanuts; that is, the splits or No. 2's, will fall through the elongated slits 13′ and drop into a suitable pan or receptacle (not shown). If any particles of dirt or other foreign matter are present in the stock, its drops through the meshes of the screening 14.

When the table is raised, its movement, which is comparatively rapid, is in a direction toward the discharge end thereof, this carrying the mixed materials forwardly, and upon a return or downwnwardly movement the table moves rearwardly and the particles to be separated, and especially those lying immediately next to the bottom of the table will, due to their inertia and gravity, fall back onto the bottom in advanced position. Because of the friction between the lowermost particles and the bottom of the table and because the friction between the surfaces of the particles gradually increases from the top of the bed to the bottom thereof, the lower layers will move at a greater rate of advancement than the upper layers; that is, because the weight upon the upper layers is less and the particles tend to remain in a state of rest, the upper layers are not affected by the movement of the table to the same degree as the lower particles and, therefore, tend to lag behind.

The unshelled peanuts or nubs have, for the most part, moved to the top of the bed before they reach the rougher supporting surface of the table; namely, the screening 14. Due to the fact that the screening 14 has a rougher surface than the metal sheet 13, the coefficient of friction between the peanuts and the screening is greater than that between the metal sheet and the peanuts lying thereon, and, therefore, the rate of advancement of the peanuts on the screen is greater. The peanuts are banked up against the abutment or shoulder 18 and flow through the discharge opening 17 onto the spout 19 and into a suitable receptacle (not shown).

The bed of mixed materials will assume the shape shown in Figure 1, from which figure it will be seen that the bed gradually increases in depth until it reaches its apex in advancement of the line between the metal bottom 13 and the screening 14, and then decreases in depth to the discharge opening 17.
Because the surface of the screening 14 is rougher than the surface 13, and due to the fact that the peanuts are banked against the shoulder 18, a circular movement of the peanuts is set up in the deepest portion of the bed, as shown by the dotted line in Figure 1. Due to the upward slope of the bed from the entrance end of the table and because of the agitation of the material, the nubs or other light weight particles, after they work themselves to the top of the bed, will gradually slide or tumble back toward the entrance end of the table and collect at a point adjacent the suction end of the pipe 28. The nubs may be manually removed from time to time by an operator, but preferably to make the apparatus entirely automatic, the pipe 28 is provided to suck up the nubs as quickly they tend to accumulate.

It will be seen from the foregoing description that after the light particles or nubs pass from the immediate vicinity of the entrance end of the table and reach the top of the bed they move rearwardly, while the shelled peanuts at the bottom of the bed move forwardly. In the event that any of the nubs should be carried as far as the screen 14, they will move to the top of the pile or bed, be carried rearwardly by the circulation of the particles in the top portion of the bed to the upwardly inclined surface of the bed and then slide or tumble down said surface until they reach a point at which they are drawn up by the suction of the air through the pipe 28.

What I claim is:

1. The method of separating materials of different specific gravities which consists in forming a bed of the materials, feeding materials in a stream to one end of the bed, imparting to the bed a composite horizontal and vertical reciprocatory motion, initially moving forwardly the materials all in the same horizontal direction longitudinally of the bed, forming a bank of the particles of higher specific gravity at one end of the bed, moving the articles of lower specific gravity forwardly against said bank and then upwardly and rearwardly in a direction opposite to that of their initial movement, removing the particles of lower specific gravity at a point intermediate the bank and the point of supply and removing the particles of higher specific gravity at the end of the bed opposite the supply end.

2. The method of separating materials of different specific gravities which consists in forming a bed of the materials, feeding materials in a stream to one end of the bed, imparting to the bed a composite horizontal and vertical reciprocatory motion, initially moving forwardly the materials all in the same horizontal direction longitudinally of the bed, the first part of said forward motion being slower than the latter part, forming a bank of the particles of higher specific gravity at one end of the bed, moving the articles of lower specific gravity forwardly against said bank and then upwardly and rearwardly in a direction opposite to that of their initial movement, removing the particles of lower specific gravity at a point intermediate the bank and the point of supply and removing the particles of higher specific gravity at the end of the bed opposite the supply end.

3. The method of separating materials which consists in forming a bed of mixed materials, feeding materials in a stream to one end of the bed, imparting to the bed a composite horizontal and vertical reciprocatory motion, removing the particles of greater specific gravity at the discharge end, and the particles of lesser specific gravity at the other end of the bed, and moving the particles adjacent the entrance end of the bed at a less speed than at the discharge end thereof.

4. The method of separating materials, which consists in forming a bed of mixed materials upon a horizontal surface the receiving end of which is smoother than the discharge end, reciprocating the surface to advance the materials thereon, feeding mixed materials to the receiving end of the bed, moving the lighter materials forwardly and rearwardly and removing them at a point adjacent the receiving end of the bed, removing the heavier materials at the other end of the bed at a point above the supporting surface of the bed, the materials at the discharge end being advanced more quickly than those at the receiving end and sifting out the smaller particles.

5. In an apparatus of the class described, a screening supporting surface lying in a horizontal plane, means for feeding materials of different specific gravities to one end of said surface, means for imparting a composite vertical and horizontal longitudinally reciprocating motion to said surface so as to advance the materials longitudinally thereon, means for forming a bank of materials at the opposite end of said surface, and means for removing the materials of lighter specific gravity at a point adjacent the supply end.

6. In an apparatus of the class described, a screening supporting surface lying in a horizontal plane, means for feeding materials of different specific gravities to one end of said surface, said end of the bed having a smoother supporting surface than the opposite end whereby the materials advance at a slower rate upon the receiving end, means for imparting a composite vertical and horizontal longitudinally reciprocating motion to said surface so as to advance the materials longitudinally thereon, means for forming a bank of materials at the opposite end of said surface, and means for removing the materials of lighter specific gravity at a point adjacent the supply end.

In testimony whereof I have hereunto set my hand.

WILLIAM A. WORTH.